| (12) | United States Patent | (10) Patent No.: | US 10,171,419 B2 |
|---|---|---|---|
| | Kravchik et al. | (45) Date of Patent: | Jan. 1, 2019 |

(54) IP ROUTE CACHING WITH TWO SEARCH STAGES ON PREFIX LENGTH

(71) Applicant: Mellanox Technologies TLV Ltd., Raanana (IL)

(72) Inventors: Fima Kravchik, Holon (IL); Pedro Reviriego, Madrid (ES); Salvatore Pontarelli, Rome (IT); Aviv Kfir, Nili (IL); Amir Roitshtein, Holon (IL); Gil Levy, Hod Hasharon (IL)

(73) Assignee: Mellanox Technologies TLC Ltd., Raanana (IL)

( * ) Notice: Subject to any disclaimer, the term of this patent is extended or adjusted under 35 U.S.C. 154(b) by 0 days.

(21) Appl. No.: 15/186,477

(22) Filed: Jun. 19, 2016

(65) Prior Publication Data

US 2017/0366502 A1  Dec. 21, 2017

(51) Int. Cl.
| H04L 12/56 | (2006.01) |
| H04L 29/12 | (2006.01) |
| H04L 12/741 | (2013.01) |
| H04L 29/08 | (2006.01) |
| H04L 12/743 | (2013.01) |

(52) U.S. Cl.
CPC .......... *H04L 61/6009* (2013.01); *H04L 45/54* (2013.01); *H04L 45/74* (2013.01); *H04L 45/7453* (2013.01); *H04L 67/2842* (2013.01)

(58) Field of Classification Search
None
See application file for complete search history.

(56) References Cited

U.S. PATENT DOCUMENTS

| 2001/0028651 A1 | 10/2001 | Murase |
| 2009/0077076 A1 | 3/2009 | Berger et al. |
| 2010/0080223 A1 | 4/2010 | Wong et al. |
| 2015/0098470 A1 | 4/2015 | Sun et al. |

OTHER PUBLICATIONS

Gupta et al., "Routing Lookups in Hardware at Memory Access Speeds", Proceedings of the Conference on Computer Communications (IEEE INFOCOMM), vol. 3, pp. 1241-1248, San Francisco, USA, Mar./Apr. 1998.
Kasnavi et al., "A cache-based internet protocol address lookup architecture", Computer Networks, vol. 52 , pp. 303-326, year 2008.
Kim et al, "Revisiting Route Caching: TheWorld Should Be Flat", Proceedings of the 10th International Conference on Passive and Active Network Measurement (PAM), 10 pages, Seoul, Korea, Apr. 1-3, 2009.

(Continued)

*Primary Examiner* — Willie J Daniel, Jr.
(74) *Attorney, Agent, or Firm* — D. Kligler IP Services Ltd.

(57) ABSTRACT

A data packet is received in a network element. The network element has a cache memory in which cache entries represent a portion of addresses stored in a main memory, The destination address and the cache entries each comprise a binary number. A first determination is made that a number M of the most significant bits of a cache entry and the destination address are identical. A second determination is made that an additional number M+L of the most significant bits of a cache entry and the destination address are identical. Routing information is then retrieved the cache memory, and the packet processed according to the routing information.

19 Claims, 5 Drawing Sheets

(56) References Cited

OTHER PUBLICATIONS

Kohler et al., "Observed Structure of Addresses in IP Traffic", IEEE/ACM Transactions on Networking, vol. 14, No. 6, pp. 1207-1218, Dec. 2006.
Liu et al., "Efficient FIB Caching using Minimal Non-overlapping Prefixes", ACM SIGCOMM Computer Communication Review, vol. 43, No. 1, pp. 15-21, Jan. 2013.
Sarrar et al., "Leveraging Zipf's Law for Traffic Offloading", ACM SIGCOMM Computer Communication Review, vol. 42, No. 1, pp. 17-22, Jan. 2012.
WAND Network Research Group, 7 pages, Apr. 22, 2010 (downloaded from http://wand.net.nz/wits/catalogue.php).
The CAIDA Anonymized Internet Traces 2014 Dataset, 2 pages, 2014 https://www.caida.org/data/passive/passive_2014_dataset.xml.
Waldvogel et al., "Scalable High-Speed Prefix Matching", Proceedings of the ACM SIGCOMM 97 Conference on applications, technologies, architectures, and protocols for computer communication, Cannes, France, pp. 25-36, Sep. 15-18, 1997.
Kfir et al., U.S. Appl. No. 15/186,562, filed Jun. 20, 2016.
U.S. Appl. No. 15/186,562 office action dated Jan. 4, 2018.
EP Application # 1776740.3 search report dated Oct. 5, 2017.

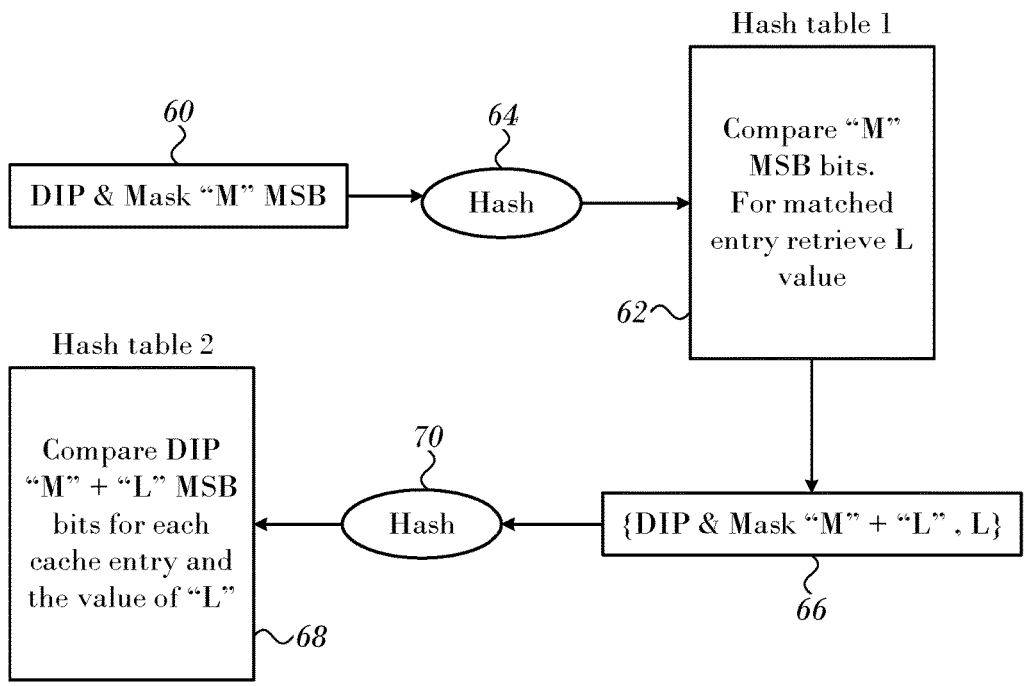
FIG. 4
FIG. 5
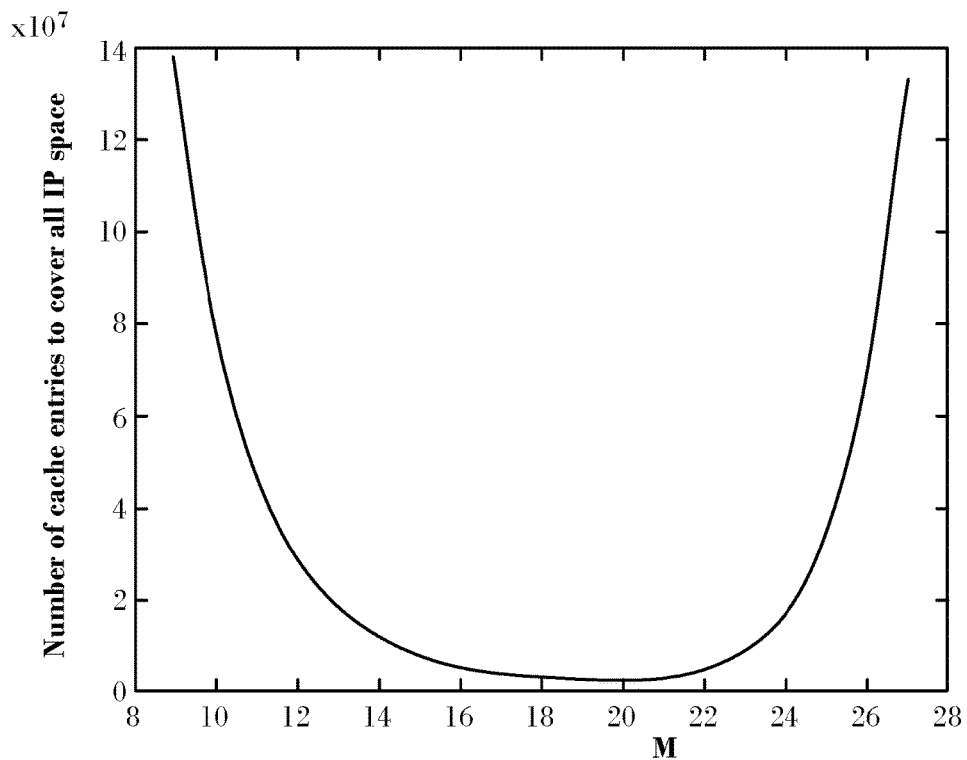

US 10,171,419 B2

IP ROUTE CACHING WITH TWO SEARCH STAGES ON PREFIX LENGTH

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to transmission of digital information. More particularly, this invention relates to cache operations in the routing of packets in data switching networks.

2. Description of the Related Art

The meanings of certain acronyms and abbreviations used herein are given in Table 1.

TABLE 1

Acronyms and Abbreviations

| | |
|---|---|
| DIP | Destination Internet Protocol Address |
| DRAM | Dynamic Random Access Memory |
| HCA | Host Channel Adapter |
| IP | Internet Protocol |
| LPM | Longest Prefix Match |
| MSB | Most Signficant Bits |
| NIC | Network Interface Card |
| RIF | Router Interface |
| SRAM | Static Random Access Memory |
| TCAM | Ternary Content Addressable Memory |

Modern internet routers determine data routing based on searching for a packet destination IP address (DIP) in a database of forwarding information known as a routing table. The routing table, rather than storing a full DIP, stores only some of the leading portion, known as a prefix. The prefix comprises some number of the most significant bits of the DIP. The remaining bits are treated as "don't care" bits for purpose of a DIP search in the routing table. However they specify a subnetwork or subnet. Computers that belong to a subnetwork are addressed by a common prefix in their IP address.

The most specific of the matching table entries—the one with the longest subnet mask—is called the longest prefix match (LPM). This is the entry in the routing table in which the largest number of leading address bits of the destination address match those in the table entry.

Searching the routing table for the LPM is a bottleneck in routing throughput. Various hardware-based solutions have been proposed. However, the circuitry required to implement such solutions becomes complex. Moreover, the increasing amount of internet traffic and demands for reduced latency have resulted in relatively costly router circuitry having high power consumption and heat dissipation.

For example, the document, *A Cache-Based Internet Protocol Address Lookup Architecture*, Soraya Kasnavi et al., Computer Networks 52 (2008) 303-326, proposes a Ternary Content Addressable Memory (TCAM) with a hardware-based LPM matching method. However, TCAM memory, while reducing the number of hash lookups, is expensive.

One option to ease the performance of an IP lookup is to implement a cache. In contrast to an LPM algorithm running on the main database, the cache can provide a lookup result with a single access to the cache database. Only searches that result in a cache miss require an IP address search by the LPM algorithm. Caching assumes that within a short period of time the same IP address is searched multiple times.

It is well known that traffic in networks in general and on the Internet in particular is not uniformly distributed. Rather, the traffic has been shown to follow a heavy tail distribution that can be modeled with a power law of a Zipf distribution. Such distributions are observed per prefix, per IP address and per flow showing that in all cases most of the traffic concentrates on a small percentage of all the elements. This distribution can be exploited in a well-constructed caching scheme.

A number of solutions have been proposed for LPM caching. Some of them employ the same algorithm on the cache and on an external device or network element, e.g., a DRAM, a router or other network device. Other schemes make caching independent of the algorithm used in the external device. In one configuration an SRAM acts as a cache for the external device.

The simplest solution for caching is to find an exact match so that each IP address is cached as an entry on the SRAM. This may be sufficient in many cases. However, the number of IP addresses covered by the cache can be dramatically increased using the LPM feature. In general, any prefix that has no compatible longer prefix can be directly cached and used on a match. However, for prefixes that have longer compatible prefixes, caching can cause a "cache hiding" problem unless all the longer compatible prefixes have also been cached. A packet to one such longer compatible prefix that is not in the cache will be incorrectly routed according to a shorter prefix stored in the cache.

There are different ways to deal with cache hiding. In one solution when a prefix is placed in the cache all longer compatible prefixes are also placed. However, this is complex to implement, particularly eviction from the cache. In a simpler approach, the length of the longest prefix that is present in the routing table is used for caching. This was explored in the document *Revisiting Route Caching: the World Should Be Flat*", C. Kim et al., Proceedings of the 10th International Conference on Passive and Active Network Measurement (PAM), but under the assumption that prefixes longer that /24 were not present in the table or were handled using a small additional table. The solution creates a /24 entry on the cache for a packet and effectively caches 256 subnet addresses per entry ($2^{(32-24)}=2^8=256$). However, a direct implementation of the scheme is impractical because there may be prefixes up to /32 in the table.

Another approach involves expansion of the routing table to ensure that it has no compatible prefixes, as proposed in the document *Efficient Fib Caching Using Minimal Non-Overlapping Prefixes*, Y. Liu, S. O. Amin and L. Wang, ACM SIGCOMM Computer Communication Review, January 2013. For example, if there is a /24 prefix with a compatible /32 prefix, /25, /26, . . . , /31 prefixes that are not compatible in the last bit with the /32 prefix are created. Those prefixes include patterns of all possible DIP addresses in the /24 prefix other than the /32 prefix. Therefore, for the purpose of routing they are equivalent to the /24 prefix when the /32 prefix is present.

SUMMARY OF THE INVENTION

According to disclosed embodiments of the invention, cache operation is optimized using a 2-stage LPM search. In a first stage, a selectable number (M) of the most significant bits of a cache entry are compared to a masked DIP. Upon a match, in a second stage a value L is retrieved and (M+L) most significant bits of the cache entry and the DIP are compared. A match in the second stage constitutes a cache hit, and forwarding information is retrieved from the cache.

There is provided according to embodiments of the invention a method, which is carried out by receiving via a data network a packet having a destination address and providing a cache memory in which cache entries represent a portion of the addresses stored in a main memory. The destination address and the cache entries each comprise a binary number. The method is further carried out by making a first determination that a number M of the most significant bits of one of the cache entries and the destination address are identical, and making a second determination that an additional number M+L of the most significant bits of one of the cache entries and the destination address are identical. The method is further carried out responsively to the second determination by retrieving routing information from cache memory, and processing the packet according to the routing information.

One aspect of the method includes receiving via the data network a new packet and using the new packet, iterating the steps of making a first determination and making a second determination with a new value of the number M.

In a further aspect of the method the cache entries are represented in the cache memory as a hash table. The steps of making a first determination and making a second determination comprise hash lookups to the hash table.

According to yet another aspect of the method, the cache entries are represented in the cache memory as a multi-way hash table.

In one aspect of the method the cache entries are represented in the cache memory as a first hash table and a second hash table. The steps of making a first determination and making a second determination comprise hash lookups to the first and second hash tables, respectively.

According to still another aspect of the method, assigning a number M is performed, using different test values of the number M, by determining a number of cache entries required to cover an address space, and assigning the number M to the one of the different test values that corresponds to a lowest number of the determined cache entries.

According to a further aspect of the method, assigning a number M is performed, using different test values of the number M, by determining a number of cache entries required to cover an address space, and assigning the number M to the one of the different test values that corresponds to a largest coverage of the address space when selecting a number of entries equal to the cache size.

An additional aspect of the method includes iteratively adjusting the number M while new packets are received.

According to another aspect of the method, adjusting the number M is performed by iteratively assigning the number M to a test value during a predefined time interval and measuring a hit rate in the cache memory at different test values, and reassigning the number M to the one of the different test values that corresponds to a highest hit rate.

There is further provided according to embodiments of the invention an apparatus, including a network element that is operative for receiving via a data network a packet having a destination address. The network element has a processor, a main memory storing a database of packet forwarding information, and a cache memory accessible to the processor. The cache memory has cache entries therein that represent a portion of the packet forwarding information of the main memory. The destination address and the cache entries each comprise a binary number. The processor is operative for making a first determination that a number M of the most significant bits of one of the cache entries and the destination address are identical, making a second determination that an additional number M+L of the most significant bits of the one cache entry and the destination address are identical, and, responsively to the second determination retrieving routing information for from the one cache entry and processing the packet according to the routing information.

BRIEF DESCRIPTION OF THE SEVERAL VIEWS OF THE DRAWINGS

For a better understanding of the present invention, reference is made to the detailed description of the invention, by way of example, which is to be read in conjunction with the following drawings, wherein like elements are given like reference numerals, and wherein:

FIG. 4 is a block diagram illustrating a method of searching a cache memory for an IP address in accordance with an embodiment of the invention;

FIG. 5 is a graph illustrating results of performing a method for selecting an attribute M in accordance with an embodiment of the invention;

DETAILED DESCRIPTION OF THE INVENTION

In the following description, numerous specific details are set forth in order to provide a thorough understanding of the various principles of the present invention. It will be apparent to one skilled in the art, however, that not all these details are necessarily always needed for practicing the present invention. In this instance, well-known circuits, control logic, and the details of computer program instructions for conventional algorithms and processes have not been shown in detail in order not to obscure the general concepts unnecessarily.

Documents incorporated by reference herein are to be considered an integral part of the application except that, to the extent that any terms are defined in these incorporated documents in a manner that conflicts with definitions made explicitly or implicitly in the present specification, only the definitions in the present specification should be considered.

Definitions

Most Significant Bit (MSB). In a binary number the most significant bit (MSB) is the bit position having the greatest value.

Most Significant Bits. In a binary number the most significant bits are the bits closest to and including the MSB.

A prefix is compatible with another shorter prefix when it has the same MSBs as the shorter prefix for all the bits that are not masked in the shorter prefix.

System Overview.

Figure 1:
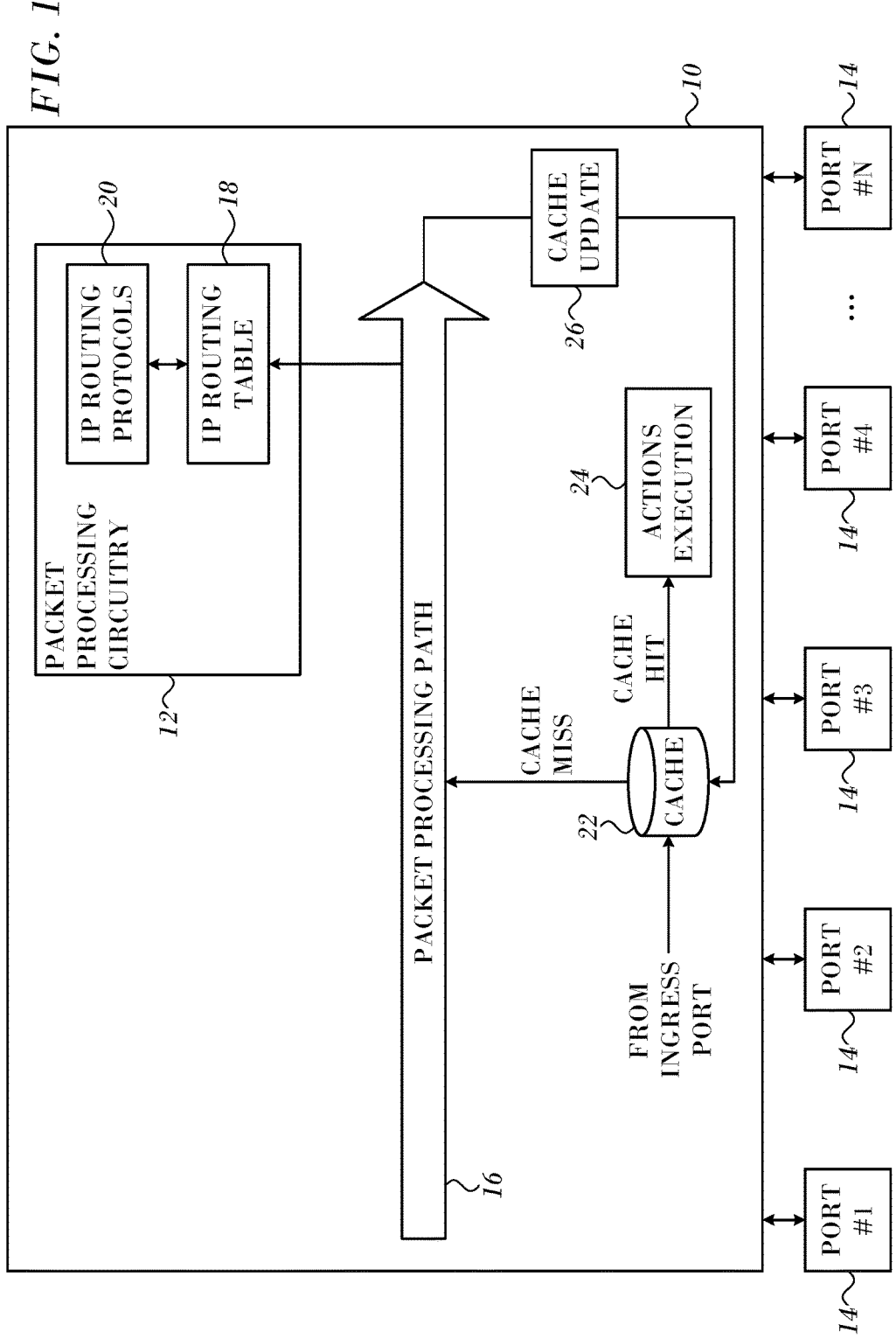
FIG. 1 is a block diagram of a network element in accordance with an embodiment of the invention.

Turning now to the drawings, reference is initially made to FIG. 1, which is a block diagram of a network element 10 in accordance with an embodiment of the invention. Network element 10 may comprise, for example, a network switch, a router or a network interface device such as a Network Interface Card (NIC) or Host Channel Adapter (HCA).

The network element 10 typically comprises packet processing circuitry 12, which may comprise a processor programmed with suitable software for coordinating and carrying out the functions described hereinbelow. Thus, although aspects of the network element 10 are shown in FIG. 1 and other figures hereof as comprising a number of separate functional blocks, these blocks are not necessarily separate physical entities, but rather could represent different computing tasks or data objects stored in a memory that is accessible to the processor. These tasks may be carried out in software running on a single processing element, or on multiple processors. The software may be embodied on any of a variety of known non-transitory media for use with a computer system, such as a diskette, or hard drive, or CD-ROM. The code may be distributed on such media, or may be distributed to the network element 10 from the memory or storage of another computer system (not shown) over a network. Alternatively or additionally, the tasks performed by packet processing circuitry 12 may be realized in hardware, such as a field programmable gate array or hard-wired logic.

Network element 10 may operate in any suitable communication network, and in accordance with any suitable communication protocol. Exemplary protocols may comprise Ethernet or InfiniBand.

Network element 10 comprises multiple ports 14, over which the network element receives input packets (also referred to as ingress packets) from a communication network and sends output packets (also referred to as egress packets) to the communication network. In a typical path or flow 16, packet processing circuitry 12 receives an input packet from one of ports 14 that is referred to as an ingress port, applies certain processing to the packet, and forwards the packet over one of ports 14 that is referred to as an egress port.

The network element 10 comprises a main database, IP routing table 18, which is used to obtain the route or prefix in order to forward the packet according to an IP routing protocol 20. Prefixes are also stored in a cache 22. For each packet a search of the cache 22 is conducted. Upon a cache hit actions regarding the new packet are performed by the packet processing circuitry 12 in an execution block 24. When there is a cache miss, reference is made to the routing table 18 to obtain the best matching route. Update of the cache may occur in block 26. The routing table 18 is sometimes referred to herein as the "main database", which can be implemented in a standalone memory or in embedded memory.

One of the tasks performed by the packet processing circuitry 12 comprises identifying the packet forwarding information using the cache. The following brief discussion explains the advantages of cache lookup according to embodiments of the invention compared with a straightforward approach.

Assume that the prefixes shown in Table 2 are stored in routing table 18:

TABLE 2

| Prefix | Forwarding information |
| --- | --- |
| 192.160.1.0/24 | RIF 1 |
| 192.160.0.0/16 | RIF 2 |

Table 3 illustrates cache entries created by several DIPs for this routing table. In the straightforward method, a cache entry stores the exact match of the searched IP address along with the result related to the LPM search, such as a forwarding decision.

TABLE 3

| | Cache entry created | |
| --- | --- | --- |
| DIP | IP address | Forwarding information |
| 192.160.1.1 | 192.160.1.1 | RIF 1 |
| 192.160.1.2 | 192.160.1.2 | RIF 1 |
| 192.160.1.3 | 192.160.1.3 | RIF 1 |
| 192.160.2.1 | 192.160.2.1 | RIF 2 |
| 192.160.3.1 | 192.160.3.1 | RIF 2 |

A search in the cache is performed by requiring a full match between the DIP and the IP addresses of the cache. Large caches typically use hash tables to perform efficient searches.

It can be seen that caching the exact match of the DIP results in cache "pollution". Pollution means that many different cache entries are created for a given prefix. This reduces the efficiency of the cache.

However, caching a prefix rather than the full IP address may lead to a wrong decision. For example:

At initialization the cache is empty.

1. The first DIP searched is 192.160.2.1.

2. A LPM search results in matching the prefix 192.160.0.0 /16. The forwarding for this prefix is RIF 2.

3. The following cache entry is created: 192.160.0.0 /16. Forward to RIF 2.

4. The second searched DIP is 192.160.1.1.

5. A hit on the cache results in forwarding the packet to RIF 2. However the right forwarding decision for this packet is RIF 1 as the DIP matches the prefix 192.160.1.0 /24, which is a longer prefix.

The information needed from the routing table 18 is the RIF and an attribute L (described below) for a /M prefix (M most significant bits of a DIP) that matches the packet. This information can be precompiled and added to the routing table in the external device, or alternatively, to a routing table in embedded memory, so that on a match the attribute L is given in addition to the RIF.

According to embodiments of the invention a 2-stage cache lookup is performed. In a first search a prefix at a number of most significant bits (M) is searched. If found, then a second search is done, comparing L additional bits in the results of the first search, L varies from 0 to 32-M in the IPv4 scheme and from 0 to 128-M for IPv6. This approach is sometimes referred to herein as an "M/L scheme".

Normally the value of the attribute L is based on the length of the longest prefix that is compatible with the /M value in the routing table 18.

The cache searches can be implemented using multi-way hash tables, i.e., there are multiple table entries per index. One method of searching such hash tables is taught in commonly assigned application Ser. No. 15/086,095, which is herein incorporated by reference.

Design Considerations.

Insertion and eviction mechanisms should be simple and the information needed from the main database to perform insertion should be easy to compute and maintain. For example, in the M,L scheme the external device, e.g., the routing table 18, should provide the value of the attribute L to use for a given insertion. The value of the attribute M should also be computed to optimize performance at startup.

Policies for insertion are needed to optimize performance. For example, inserting on every cache miss may require excessive bandwidth and create oscillations of elements going in and out of the cache. On the other hand, reducing insertion to a fraction of the cache misses will make the cache less responsive to traffic changes. More complex adaptive schemes that reduce insertions when the hit ratio is high can also be used.

A similar reasoning applies to eviction policies. The simplest algorithm is to randomly select for eviction an element that is in the position where a new element is to be inserted. More sophisticated algorithms can be used where usage or the type of entry can be used to select the element to be removed. For example, in the M,L scheme removal of elements with a large value of the attribute L may be preferred as such elements cover relatively few IP addresses.

Figure 2:
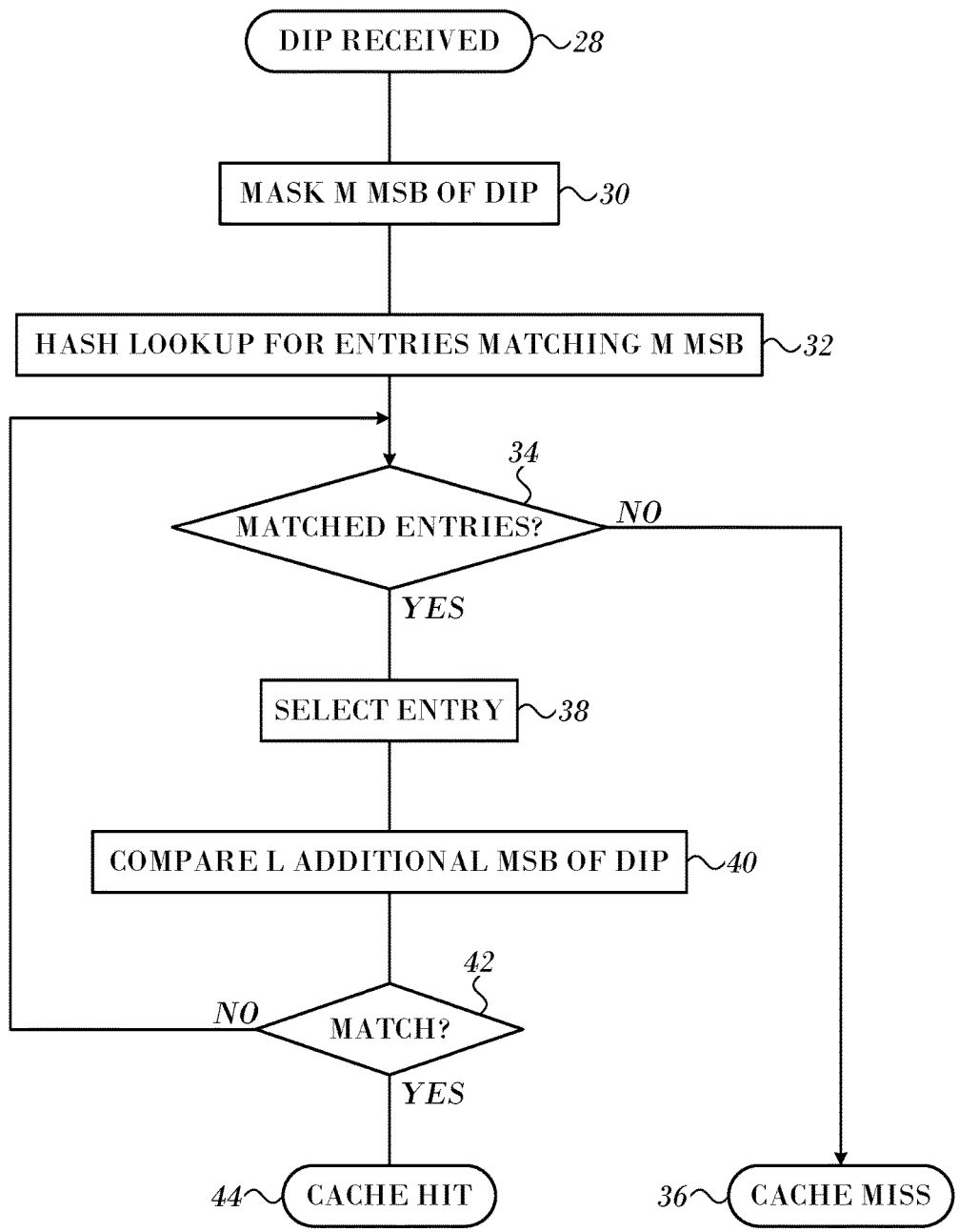
FIG. 2 is a flow chart of a method of performing cache lookups of IP addresses in accordance with an embodiment of the invention.

Reference is now made to FIG. 2, which is a flow chart of a method of performing cache lookups of IP addresses in accordance with an embodiment of the invention. The process steps are shown in a particular linear sequence in FIG. 2 for clarity of presentation. However, it will be evident that many of them can be performed in parallel, asynchronously, or in different orders. Those skilled in the art will also appreciate that a process could alternatively be represented as a number of interrelated states or events, e.g., in a state diagram. Moreover, not all illustrated process steps may be required to implement the method.

At initial step 28 a DIP to be searched is received. Then, at step 30 A number M of its most significant bits (MSB) are masked. The attribute M is variable and can range from 1 to 32 for IPv4 addresses and 1 to 128 for IPv6 addresses. Choosing a value for the attribute M is explained below.

Next, at step 32 an exact match lookup, e.g., a hash lookup of the cache is performed on the DIP with M most significant bits masked using any suitable exact match algorithm. In the case of hash tables, this step identifies up to N entries in the cache. When hash lookups are used, the value N refers to the number of ways in a hash table, or the number of hash tables being searched, according to the implementation chosen.

Next, at decision step 34, it is determined if there are cache entries that were identified in step 32 remaining to be processed. If the determination at decision step 34 is negative, then control proceeds to final step 36. A cache miss is reported.

If the determination at decision step 34 is affirmative, then control proceeds to step 38. One of the entries identified in step 32 is selected. In step 40 a number L additional bits of the DIP are compared with those of the selected entry. The attribute L is obtained by analysis of the routing table 18 (FIG. 1) and stored in the cache. It is based on the maximum prefix length of the compatible routing table entries found in the routing table 18.

Then, at decision step 42, it is determined if the comparison results in a match between the two. If the determination at decision step 42 is negative, then control returns to decision step 34 to evaluate another entry yielded by step 32, if any.

If the determination at decision step 42 is affirmative, then control proceeds to final step 44. A cache hit is reported. Forwarding information from the matched entry is retrieved and processed conventionally.

Figure 3:
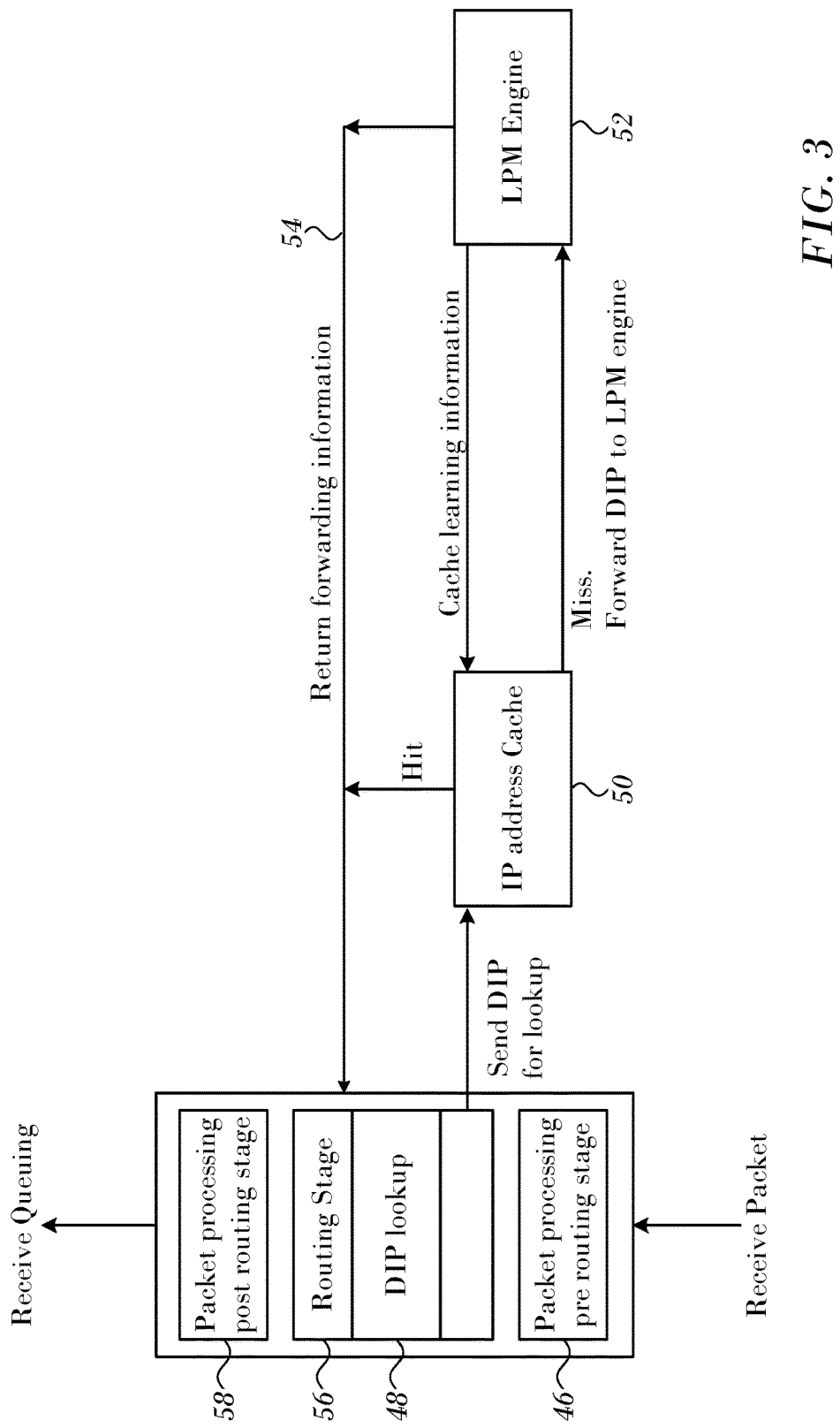
FIG. 3 is a block diagram illustrating an implementation of the method shown in FIG. 2 in accordance with an embodiment of the invention.

Reference is now made to FIG. 3, which is a block diagram illustrating an implementation of the logic shown in FIG. 2 in accordance with an embodiment of the invention. A received packet undergoes pre-routing processing in block 46, e.g., classification or prioritization. This is conventional, and not within the scope of this disclosure. Then at block 48 a DIP lookup of is initiated in cache block 50. Cache misses are referred to an LPM engine 52, which may return a cache hit via bus 54, or upon failure to identify a LPM, may report a default entry, causing the cache to be reexamined in the cache block 50. Routing information is assimilated in a routing stage block 56. Then in post-routing stage block 58 additional processing may occur, which is outside the scope of this disclosure. Thereafter the packet is queued.

Search Procedure.

The attribute M is a global parameter that determines the mask size used for hashing the searched IP address. For instance, for IPv4 addresses the mask size can be 24 or 28 bits. The searched IP is masked with the predefined mask and hashed to access the cache database. In order to avoid the pollution phenomena, the mask size is set to a value smaller than the number of bits of an IP address. For some values of the masked data, a compatible prefix length exists in the routing table that is longer than the size of the mask. Such prefixes are also considered to be compatible entries.

For cases where compatible entries exist, the cache entry includes additional information on the match required. Storage for this information is referred to as a "delta field". The delta field contains information that specifies the number of additional bits (L) needed for a further comparison between the searched IP address using M bits and the IP address that was found in the cache.

A cache hit is declared only if the most significant M+L most significant bits of the searched IP and the cache entry IP address are equal.

Insertion Procedure.

Continuing to refer to FIG. 3 and also to FIG. 1, upon a cache miss the searched DIP address is sent to the LPM engine 52, which searches the routing table 18 for the LPM. The algorithm used by the cache block 50 to search the cache 22 and the algorithm to search the routing table 18 need not be identical. Regardless of the memory searched or the algorithm employed, the search provides the following information to the cache block:

(1) Forwarding information based on the matched prefix. Routing tables normally include a default entry so that all searches produce this information.
(2) The highest prefix length compatible with the DIP.

An entry in the cache is created as follows:
(1) Delta field=Max
(global mask size, highest prefix length reported by the LPM algorithm)−global mask size.
(2) IP address=Searched IP address. The bits that are stored are according to global mask size (M)+Delta value. (L)
(3) Forwarding information.

EXAMPLE 1

Table 4 stores the following prefixes. The cache parameter M is 24.

TABLE 4

| Prefix | Forwarding information |
|---|---|
| 192.160.1.0/24 | RIF 1 |
| 192.160.2.240/28 | RIF 2 |
| 192.170/16 | RIF 3 |
| /0 (default route) | RIF 4 |

In Table 5, the following IP addresses have resulted in cache entries:

TABLE 5

| | Cache entry created | | | |
|---|---|---|---|---|
| DIP | IP | L | Forwarding | Comments |
| 192.160.1.1 | 192.160.1.0 | 0 | RIF 1 | Avoids pollution by using the same cache entry for these two IPs (or more . . .) |
| 192.160.1.2 | | | | |
| 192.160.2.128 | 192.160.2.128 | 4 | RIF 4 | This DIP only matches the default route. It is therefore forwarded to port 4, as there are compatible rules with prefix length 28 (L = 4). |
| 192.160.2.255 | 192.160.2.240 | 4 | RIF 2 | |
| 192.170.1.1 | 192.170.1.0 | 0 | RIF 3 | A cache entry stores at least the masked bits (M = 24 bits) |

Populating the cache with a new entry on a cache miss can be performed as follows:

1) Extract the /M prefix of the DIP.
2) Take as L the length of the longest compatible prefix in the routing table for that /M prefix.
3) if L=0 insert the entry, checking first to determine that it is not already present. A read before write is needed for the check.
4) if L>0 insert an entry if not already present a first stage (hash table 62 (FIG. 4)) with the L value and an entry in a second stage (hash table 68) at /(M+L) with the RIF.

Collisions.

Hashing only some of the bits of the IP address may lead to collisions, i.e., two different inputs that produce the same hash output. Such collisions reduce cache memory utilization, and hence increase the probability of a cache miss.

EXAMPLE 2

Table 6 stores the following prefixes (Cache parameter M=24)

TABLE 6

| Prefix | Forwarding information |
|---|---|
| 192.160.0.128/32 | RIF 1 |
| 192.160.0.0/16 | RIF 2 |

All the DIPs with values of 192.160.0.A, where "A" is any value other than 128 create a different cache entry with the information shown in Table 7:

TABLE 7

| | Cache entry created | | |
|---|---|---|---|
| IP address | IP | L | Forwarding information |
| 192.160.0.128 | 192.160.0.0 | 8 | RIF 1 |
| 192.160.0.1 | 192.160.0.1 | 8 | RIF 2 |
| . . . | | | |
| 192.160.0.n | 192.160.0.n | 8 | RIF 2 |

Table 7 shows that for a cache implemented as a hash table all the entries having the same key (24 MSB) are mapped to the same addresses in the hash table. When a compatible prefix length >24 exists in the routing table for these IP addresses, the cache must generate different entries for each such IP address.

Reference is now made to FIG. 4, which is a block diagram illustrating a method of searching a cache memory for an IP address in accordance with an embodiment of the invention. Using the arrangement of FIG. 4, the problem can be overcome by dividing the cache into two hash tables that are examined sequentially.

In block 60 M most significant bits of a DIP are masked as described above and a first hash key generated from the result. A hash lookup to a first hash table 62 is shown in block 64 using the first hash key. The hash table 62 stores only M most significant bits of the IP addresses. For IP prefixes less than or equal to the attribute M that have compatible prefixes in the main data base the value of the attribute L is also stored. The function of the hash table 62 is to provide the attribute L for a second hash table lookup.

A first comparison is made between M most significant bits of entries found in the hash table 62 and the masked DIP. When a match is found, a first value of the attribute L is retrieved from the entry.

Using the first value of the attribute L, the DIP is masked with M+L most significant bits in block 66 and a second hash key generated from the result. The second hash key comprises the DIP with M+L bits masked, and another field denoting the value of M+L. The latter field can be viewed as directing the hardware to search for an exact match in a specific table. A hash lookup to a second hash table 68 is shown in block 70 using the second hash key. For each entry found in the hash lookup of block 70 a second comparison is made with M+L most significant bits of the DIP. When a match is found, a possible hit has been achieved, and a second value of the attribute L is retrieved from the entry. A third comparison is made between the first and second values of the attribute L. If the third comparison results in a match then a cache hit is reported.

Table 8 describes the content of the two hash tables 62, 68 using the data shown in Table 5 and M=24:

TABLE 8

| | Cache entry created | | | | |
|---|---|---|---|---|---|
| | Hash table 1 | | Hash table 2 | | |
| DIP | IP | L | IP | L | Forwarding information |
| 192.160.1.1 | 192.160.1.0 | 0 | 192.160.1.0 | 0 | RIF 1 |
| 192.160.1.2 | | | | | |
| 192.160.2.128 | 192.160.2.0 | 4 | 192.160.2.128 | 4 | RIF 4 |
| 192.160.2.255 | | | 192.160.2.240 | 4 | RIF 2 |
| 192.170.1.1 | 192.170.1.0 | 0 | 192.170.1.0 | 0 | RIF 3 |

Removal Procedure.

For achieving high cache efficiency the removal procedure should follow the following order:

(1) Remove an entry from the hash table 68.

(2) Remove an entry from the hash table 62 with a priority eviction for entries that do not have corresponding entries in the hash table 68.

In order to reduce implementation complexity for eviction there should be a hit on both hash tables 62, 68. For either (1) a miss on the hash table 62, or (2) a hit on hash table 62 and a miss on hash table 68 perform a full lookup on the main database.

The following discussion relates to size considerations and optimizations for the hash tables 62, 68:

(1) Some entries in the second hash table can be avoided: For prefix entries in the hash table 62 with the attribute L=0, avoid storing (and searching) on the hash table 68. As these prefixes do not have compatibles rules with the attribute L>0 the hash tables 62, 68 table will store the same information and are therefore redundant.

(2) in order to save space for prefix entries when the attribute L=0 avoid storing any information in the hash table 62. For a search producing a miss on the hash table 62 perform the search on the hash table 68 with the attribute L=0.

(3) A variant of this option also saves entries on the hash table 62: Avoid storing prefixes with the attribute L="Y" in the hash table 62.

(4) This option provides better utilization of the hash table 62, which now stores the delta field. It will be recalled that this includes the attribute L, and forwarding information. In other words, the hash table 62 is also used to store the first cache entry of a prefix. For a match on both M+L in the hash table 62 there is no need to access the hash table 68. The hash table 68 is now accessed for a match of only M most significant bits of an entry in the hash table 62.

Selection of M.

In an aspect of the invention the value of the attribute M is variable. Its initial value can be chosen by the algorithm of Listing 1. This value can later be adjusted dynamically to adapt to the nature of the traffic. A process is also needed to change the value of the attribute M while the cache is handling traffic. These issues are discussed in the following. A binary search tree (BST) is constructed from the data in the main memory or routing table. Markers are included in at least a portion of the nodes of the tree. The markers provide branching guidance for a search of the tree, indicating whether the longer or shorter subtree should be selected. The markers are similar to prefixes of an IP address, but lack associated information fields. Their presence or absence in a node is significant. The placement and use of such markers in a search tree are known from the document *Scalable High-Speed Prefix Matching*, Waldvogel et al, (1997) in *Proceedings of the ACM SIGCOMM '97 conference on Applications, technologies, architectures, and protocols for computer communication*, pp 25-36, which is herein incorporated by reference.

---
Listing 1
---

Selection of initial value of M from the routing table.
Set M = 1.
Create a binary search tree with root=M.
For each marker in M
{
  count_marker++
  count_entries +=1 + (1<<(L–M)); // number of cache_entries needed to cover this /M
}

---

Compute the total number of cache entries needed to cover all the IP address space:
count_entries+=(1<<M)–count_markers //add the non markers
Increase M and go to 2 until all values of M have been tested.
Select the value of M that needs the lowest number of cache entries (count_entries).

In Listing 1, the attribute L is set to the maximum prefix length of the compatible entries in the routing table. The algorithm tries to select the value of the attribute M for which the fewest entries are needed to cover all the IP address space. Reference is now made to FIG. 5, which is a graph illustrating results of performing the algorithm of Listing 1 on one database in accordance with an embodiment of the invention. It can be seen that the value of M selected is about 20. The algorithm of Listing 1 treats all possible cache entries equally and does not take in to account the cache size. In reality, the shorter entries (those with L=0 or small values of L) are more likely to be in the cache as they cover a larger number of IP addresses.

Using a second algorithm, shown in Listing 2, estimation of the coverage of a cache of size C can be computed and an optimum value of the attribute M selected:

---
Listing 2
---

Select a value of M = 1.
Create a BST with root=M.
For each marker in M
{
count_marker++
count_entries_L += (1<<(L–M)); // count entries with that L value
}
Compute the total number of count_entries_M:
count_entries_M = (1<<M) – count_markers //add the non markers
Select C entries starting from M, L = 1, L = 2, . . . and add
coverage_cache += count_entries_M*(1<<(32–M))
coverage_cache += count_entries_L(L =1)*(1<<(32–L))
. . .
until C entries have been added.
Select the M that has the highest coverage_cache.

---

The algorithm of Listing 2 assumes that short prefixes take precedence and go into the cache first. This is not necessarily true. Skewed traffic distribution can distort the pattern. For example a prefix/32 can be frequently encountered and go into the cache, while a prefix/24 may have almost no traffic. Therefore, this is an approximation that differs from the result of Listing 1.

Figure 6:
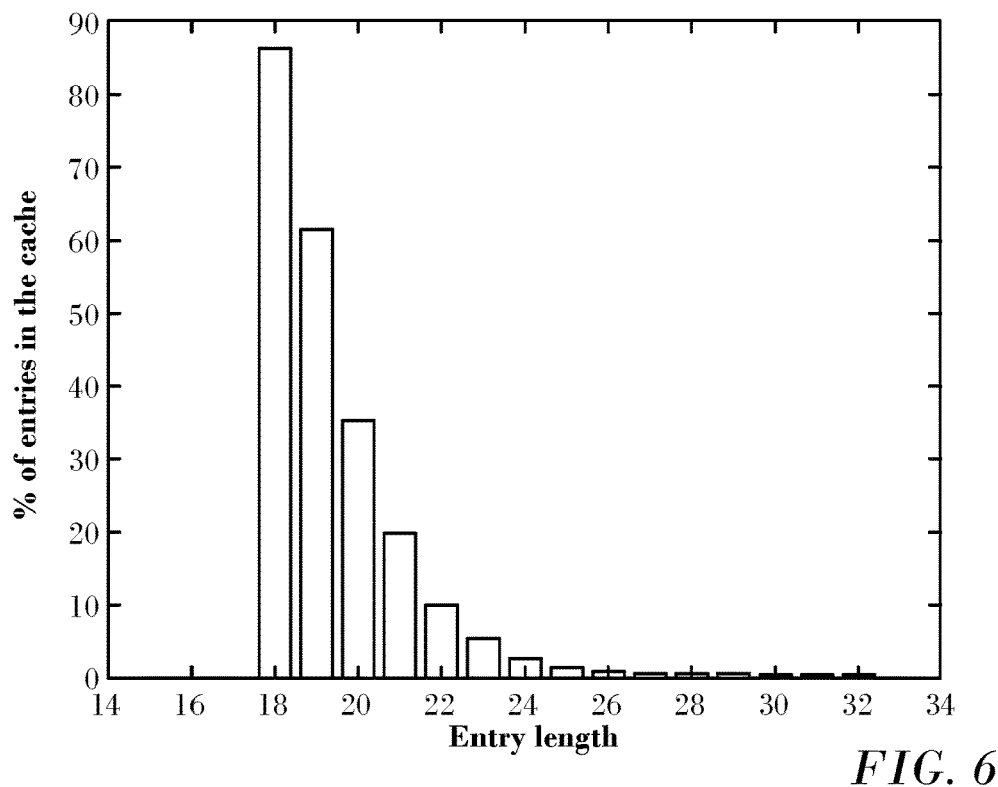
FIG. 6 is a graph illustrating results of performing a method for selecting an attribute M in accordance with an alternate embodiment of the invention.

Reference is now made to FIG. 6, which is a bar chart constructed at the end of a simulation using the same database, showing the percentages of entries in the cache against entry length in accordance with an embodiment of the invention. Shorter prefixes tend to be cached as expected. This is clearly seen in FIG. 6. For short prefix lengths almost all entries are in the cache.

Figure 7:
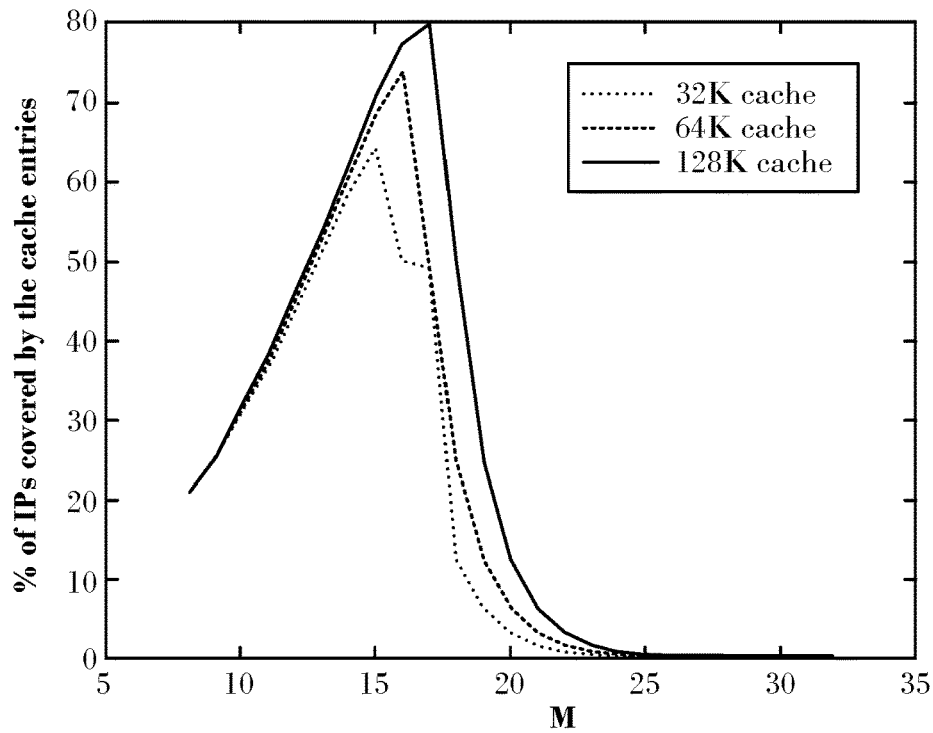
FIG. 7 is a graph comparing cache sizes when performing the method of FIG. 6 in accordance with an embodiment of the invention.

Reference is now made to FIG. 7, which is a comparison of several cache sizes (32, 64 and 128K), using the same database in accordance with an embodiment of the invention. The optimal values of the attribute M are smaller (15, 16 and 17 for 32, 64 and 128K caches, respectively) than in the first algorithm, as expected and are closer to values obtained by simulation. It may also be noted that the cache can cover a large fraction of the IP address space ($2^{32}$ addresses).

The algorithm of Listing 1 provides an upper bound on the attribute M, while the algorithm of Listing 2 provides a better estimate of M. Therefore, a value between the two, but closer to the second can be used as the initial value of the attribute M.

Adaptation of M.

The algorithms presented in Listing 1 and Listing 2 can be used to select initial values or ranges for the attribute M, but the initial values may not be optimal in all traffic conditions. Therefore, different values of M can be tested during operation and the hit rate measured. As the cache only needs a few million packets to stabilize the hit rate, the measurements can be done in a fraction of a second during which significant changes in traffic are unlikely, at least in the case of Internet routing.

In more detail, the algorithm from M=Mi is given in the pseudocode of Listing 3.

---
Listing 3
---
Repeat {
    Set M = Mi+1 and measure hit rate.
    Set M = Mi−1 and measure hit rate.
    Select a new value of M among Mi−1, Mi,M+1 that gives the best result.
} after a given time interval has elapsed
---

The search can be restricted to a range and complemented with larger jumps when traffic is not critical. For example if at some point traffic is low one can afford to test other values of M.

In order to transition between a first value and a second value of the attribute M, two caches may be operated concurrently, one having the current value of M (old cache) and the other having the new value (new cache). The process of changing from the old to the new is done at increments of /8 MSB using a threshold value. For DIPS that exceed the threshold value the old cache is used, and for DIPS that do not exceed the threshold value the new cache is used. After an interval the threshold is increased by one increment and the process is repeated until the value reaches 256 as then all the /8 have been migrated to the new value of M. Using an increment of /8 corresponds to affecting 1/256 of the traffic at a time (assuming a uniform distribution). This procedure produces a smooth transition from one value of the attribute M to another so that the impact on the hit rate is small.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A method, comprising the steps of:
maintaining a routing table of destination addresses in a main memory, the destination addresses comprising binary numbers having respective prefixes of most significant bits;
receiving via a data network a packet having a packet destination address;
providing a cache memory having exactly one table of cache entries stored therein, the cache entries comprising respective cached destination addresses and respective delta values (L),
assigning a global mask size (M), wherein the global mask size specifies a number of most significant bits needed for first comparisons between the packet destination address and the cached destination addresses, and the delta value specifies a number of additional most significant bits needed for second comparisons between the packet destination address and the cached destination address;
deriving the delta values by determining a maximum prefix length of the prefixes of the destination addresses in the routing table that are compatible with the respective cached destination addresses;
in a first search of the table of cache entries making a determination that in one of the first comparisons M most significant bits of the cached destination address of a first cache entry and the packet destination address are identical;
computing a sum of the global mask size and the delta value of the first cache entry to yield a new number (M+L);
performing the second comparisons in a second search of the table of cache entries; and
when in one of the second comparisons the new number (M+L) of most significant bits of the cached destination address of a second cache entry and the packet destination address are identical, performing the steps of:
retrieving routing information from the cache memory; and
processing the packet according to the routing information.

2. The method according to claim 1, further comprising:
upon a failure to determine that in one of the second comparisons the new number (M+L) of most significant bits of the cached destination address and the packet destination address are identical adding a new entry to the table of cache entries, the new entry comprising the new number (M+L) of most significant bits of the packet destination address.

3. The method according to claim 1, wherein deriving the delta values comprises subtracting the global mask size from the maximum prefix length of the prefixes of the destination addresses in the routing table that are compatible with the respective cached destination addresses.

4. The method according to claim 3, wherein the maximum prefix length is determined when populating the table with a new entry.

5. The method according to claim 1, wherein the cache entries are represented in the cache memory as a hash table and the steps of performing the first search and the second search comprise hash lookups to the hash table.

6. The method according to claim 5, wherein the cache entries are represented in the cache memory as a multi-way hash table.

7. The method according to claim 1, further comprising iteratively adjusting the global mask size while new packets are received.

8. The method according to claim 7, wherein assigning a global mask size is performed by:
at different test values of the global mask size determining a number of cache entries required to cover an address space; and
assigning the global mask size to one of the different test values that corresponds to a lowest number of the determined cache entries.

9. The method according to claim 7, wherein assigning a global mask size is performed by:
at different test values of the global mask size determining a number of cache entries required to cover an address space; and
assigning the global mask size to one of the different test values that corresponds to a largest coverage of the address space when selecting a number of entries equal to a cache size.

10. The method according to claim 7, wherein adjusting the global mask size is performed by:
assigning the global mask size to a test value during a predefined time interval;
measuring a hit rate in the cache memory at the test value;
iterating the steps of assigning a global mask size and measuring a hit rate at different test values; and
reassigning the global mask size to one of the different test values that corresponds to a highest hit rate.

11. An apparatus, comprising:
a network element connected to a data network;
a processor in the network element;
a main memory;
maintaining a routing table of destination addresses in the main memory;
a cache memory accessible to the processor, having exactly one table of cache entries stored therein, the cache entries comprising respective cached destination addresses and respective delta values (L), the destination addresses of the routing table and the cache entries comprising binary numbers having respective prefixes of most significant bits,
wherein the network element is configured for:
receiving via the data network a packet having a packet destination address;
assigning a global mask size (M), wherein the global mask size specifies a number of most significant bits needed for first comparisons between the packet destination address and the cached destination addresses, and the delta value specifies a number of additional most significant bits needed for second comparisons between the packet destination address and the cached destination address;
deriving the delta values by determining a maximum prefix length of the prefixes of the destination addresses in the routing table that are compatible with the respective cached destination addresses;
in a first search of the table of cache entries making a determination that in one of the first comparisons M most significant bits of the cached destination address of a first cache entry and the packet destination address are identical;
computing a sum of the global mask size and the delta value of the first cache entry to yield a new number (M+L);
performing the second comparisons in a second search of the table of cache entries; and
when in one of the second comparisons the new number (M+L) of most significant bits of the cached destination address in a second cache entry and the packet destination address are identical, performing the steps of:
retrieving routing information from the cache memory; and
processing the packet according to the routing information.

12. The apparatus according to claim 11, further comprising:
upon a failure to determine that in one of the second comparisons the new number (M+L) of most significant bits of the cached destination address and the packet destination address are identical adding a new entry to the table of cache entries, the new entry comprising the new number (M+L) of most significant bits of the packet destination address.

13. The apparatus according to claim 11, wherein deriving the delta values comprises subtracting the global mask size from the maximum prefix length of the prefixes of the destination addresses in the routing table that are compatible with the respective cached destination addresses.

14. The apparatus according to claim 13, wherein the maximum prefix length is determined when populating the table with a new entry.

15. The apparatus according to claim 11, wherein the cache entries are represented in the cache memory as a hash table and the steps performing the first search and the second search comprise hash lookups to the hash table.

16. The apparatus according to claim 11, wherein the processor is operative for iteratively adjusting the global mask size while new packets are received.

17. The apparatus according to claim 16, wherein the processor is operative for assigning a global mask size by:
at different test values of the global mask size determining a number of cache entries required to cover an address space; and
assigning the global mask size to one of the different test values that corresponds to a lowest number of the determined cache entries.

18. The apparatus according to claim 16, wherein the processor is operative for assigning a global mask size by:
at different test values of the global mask size determining a number of cache entries required to cover an address space; and
assigning the global mask size to one of the different test values that corresponds to a largest coverage of the address space when selecting a number of entries equal to a cache size.

19. The apparatus according to claim 16, wherein the processor is operative for adjusting the global mask size by:
assigning the global mask size to a test value during a predefined time interval;
measuring a hit rate in the cache memory at the test value;
iterating the steps of assigning a global mask size and measuring a hit rate at different test values; and
reassigning the global mask size to one of the different test values that corresponds to a highest hit rate.

* * * * *